United States Patent
Wedding

(12) 
(10) Patent No.: US 6,295,152 B1
(45) Date of Patent: Sep. 25, 2001

(54) OPTICAL RECEIVER FOR RECEIVING DIGITALLY TRANSMITTED DATA

(75) Inventor: Berthold Wedding, Korntal-Münchingen (DE)

(73) Assignee: Alcatel, Paris (FR)

( * ) Notice: Subject to any disclaimer, the term of this patent is extended or adjusted under 35 U.S.C. 154(b) by 0 days.

(21) Appl. No.: 09/209,472

(22) Filed: Dec. 11, 1998

(30) Foreign Application Priority Data

Dec. 11, 1997 (DE) ............................................. 197 54 993
May 12, 1998 (DE) ............................................. 198 21 142

(51) Int. Cl.$^7$ ................................................. H04B 10/06
(52) U.S. Cl. ........................................... 359/189; 359/194
(58) Field of Search ..................... 359/158, 189, 359/194, 195; 375/224, 232, 316, 317, 346, 350

(56) References Cited

U.S. PATENT DOCUMENTS

| | | |
|---|---|---|
| 4,481,678 | 11/1984 | Sakamoto et al. . |
| 4,701,904 | 10/1987 | Darcie . |
| 4,997,249 | 3/1991 | Berry et al. . |
| 5,329,118 | 7/1994 | Riza . |
| 5,333,147 | 7/1994 | Nohara et al. . |
| 5,371,625 | 12/1994 | Wedding et al. . |
| 5,510,919 | 4/1996 | Wedding . |

FOREIGN PATENT DOCUMENTS

| | | |
|---|---|---|
| 2 154 735 | 6/1972 | (DE) . |
| 30 00 060 C2 | 8/1980 | (DE) . |
| 30 08 187 C2 | 9/1980 | (DE) . |
| 32 13 022 A1 | 10/1983 | (DE) . |
| 33 29 470 A1 | 3/1985 | (DE) . |
| 39 42 817 A1 | 6/1991 | (DE) . |
| 40 38 904 A1 | 6/1992 | (DE) . |
| 42 07 036 A1 | 9/1993 | (DE) . |
| 44 21 441 A1 | 4/1995 | (DE) . |
| 195 15 158 C1 | 3/1996 | (DE) . |
| 196 12 604 A1 | 10/1997 | (DE) . |
| 296 15 994 U1 | 11/1997 | (DE) . |
| 197 53 472 A1 | 6/1998 | (DE) . |
| 197 54 993 A1 | 6/1999 | (DE) . |
| 0 405 679 A1 | 1/1991 | (EP) . |
| 0 455 910 A2 | 11/1991 | (EP) . |
| 0 554 736 A2 | 8/1993 | (EP) . |
| 0 554 736 B1 | 8/1993 | (EP) . |
| 59-171230 | 9/1984 | (JP) . |
| 3-222554 A | 10/1991 | (JP) . |

OTHER PUBLICATIONS

M. Sherif, "Decision–point steering in optical fibre communication system" IEEE Proceedings, vol. 136, No. 3, 1989, p. 169 ff.

*Primary Examiner*—Leslie Pascal
*Assistant Examiner*—Dalzid Singh
(74) *Attorney, Agent, or Firm*—Sughrue, Mion, Zinn, Macpeak & Seas, PLLC

(57) ABSTRACT

An optical receiver for receiving digitally transmitted data, the receiver containing connected a digital filter 2 and a decision circuit 3 to it for detecting the incoming data signals 1, and a clock contact 15, the decision circuit being connected with a computing unit 5 and containing a pseudo-error monitor circuit for detecting bit errors, and parameters of the digital filter 2 and of the decider/pseudo-error monitor circuit 3 being adjustable by the computing unit 5 connected to them.

20 Claims, 5 Drawing Sheets

OPTICAL RECEIVER FOR RECEIVING DIGITALLY TRANSMITTED DATA

BACKGROUND OF THE INVENTION

The invention is directed to an optical receiver for receiving digitally transmitted data.

When digital signals with a high bit sequence frequency (gigabit range) are transmitted, various dispersion-effects occur caused by optical fibre cables in the optical transmission system. These dispersion effects distort the data signals, thus limiting the transmission lengths. Distortions can also occur on the optical fibre due to non-linear effects, e.g. the Kerr effect. Optical receivers used in such a transmission system are required to evaluate distorted signals, permitting only low bit error rates. It is known from the publication "Decision-point steering in optical fibre communication system", M. Sherif, IEEE Proceedings, Volume 136, No. 3, 1989, page 169 ff, that a receiver in a digital optical transmission system can be optimized by modifying decider thresholds, thus generating artificial errors. For this purpose a second decider circuit is applied parallel to the main data flow. This second signal branch is subjected to a large number of bit errors. The artificial error rate is achieved in the publication in question by modifying the decider threshold, which is changed by means of a square pulse. The results of the two deciders are compared, and from the result actuating variables are derived for an amplifier and for the receiving photodiodes. If you examine the eye diagram of the signal received, the first decider scans the eye aperture at an almost optimal point; i.e. both the decider threshold and the scanning window are roughly in the center of the open eye. The second signal path changes the decider threshold so that the threshold can already be in the noise of the eye diagram, and so artificial errors occur. By evaluating these artificial errors the whole optical receiver is readjusted to optimize the eye aperture, noise characteristics, etc.

A digital optical message transmission system is disclosed in EP 0554 736 B1 in which the receiver quality is optimized by evaluating the eye diagram. In this case an eye diagram is recorded in the receiver, and the size of the eye aperture is determined in a computer. The computer determines an optimum setting of the photodiode and the decider threshold from the data recorded. Recording an eye diagram, comparing with a stored nominal value, and adjusting various receiver activating variables does not enable the bit error rate to be directly determined and a required resultant optimization of the receiver.

SUMMARY OF THE INVENTION

The optical receiver disclosed for receiving digitally transmitted data with the characteristic features of the present invention has in contrast the advantage that bit error rates can be determined, even individual bit errors being detected. The optical receiver offers the advantage of having a pseudo-error monitor circuit for detecting bit errors as a function of threshold value and phase position, these measured data serving to adjust the parameters of the filter and the decider circuit itself. The computing unit linked to the receiver adjusts the parameters on the basis of the measured bit error data. The measures listed in the sub-claims enable advantageous developments and improvements of the optical receiver presented in the main claim. It is particularly advantageous that in the circuit disclosed two independent error signals are determined, the first error signal serving to derive high bit error rates, and the second error signal being used to detect individual bit errors.

The system has the advantage that both the phase position and the threshold value of the decider circuits are affected. In this case the adjustment is simply made by means of computing unit signals using phase shifters and phase adjusting members. In order to avoid errors of measurement through the different phase positions, the phase position is advantageously corrected by an additional scanning device. As a result the signal branches are scanned at the same times, and the results are comparable.

The optical receiver in the device disclosed enables scanning of multi-level signals to be simply compared by several deciders being connected in parallel, and their result read out via a switch activated by the computing unit. For reading out multi-level signals it is important that the phase adjustments of the various deciders are also connected to the decider via a switch, so that any phase shift present is avoided at readout time. The data derived offers the advantage of acting to optimize a filter that is constructed from a chain of input amplifiers and output: amplifiers to achieve high data rates. This makes it easy to implement a filter function of a transversal filter even at: high data rates. In this case the digital multiplier units of the filter are adapted by the computing unit. The filter of the optical receiver in the device disclosed can be cascaded over the outlets, creating a sequence of filters with which filters of even higher order can be realized.

It is particularly advantageous that the amplification factors and the weighting factors of the multiplier circuits are variable and adjustable.

It is thus possible to optimize the filter on the basis of data determined in the receiver.

The rope-ladder structure makes it easy to realize a filter function of a transversal filter even at high data rates. In this case the weighting factors of the filter's digital multiplier unit are adapted by a computing unit. The filter of the optical receiver in the device disclosed can be cascaded through the outputs to create a sequence of filters with which filters of even higher order can be realized.

BRIEF DESCRIPTION OF THE DRAWINGS

Embodiments of the invention are explained in greater detail in the following description in conjunction with the drawings, wherein.

DETAILED DESCRIPTION OF THE INVENTION

Figure 1:
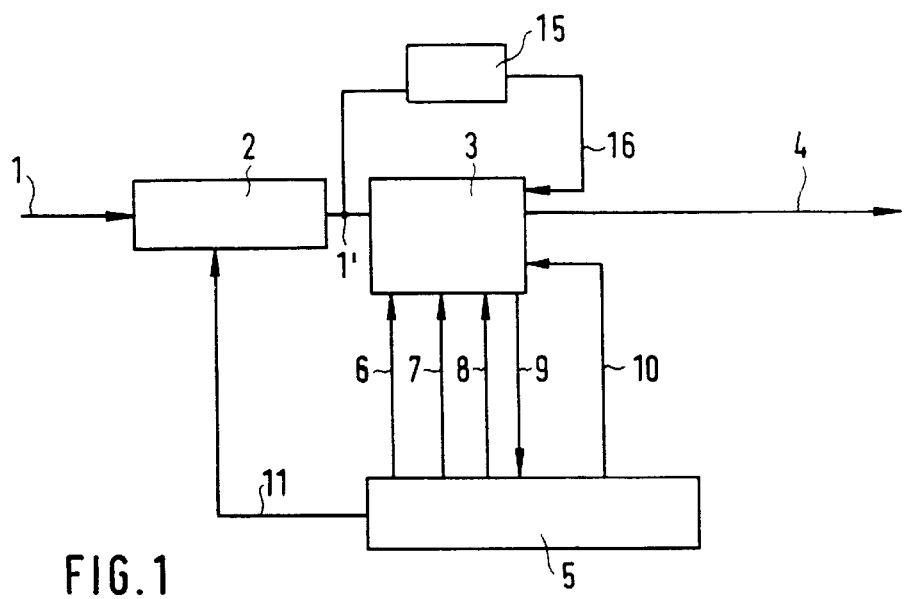
FIG. 1 shows the structure of an optical receiver.

FIG. 1 shows an input signal 1 that passes first through a filter 2 and then a decider/pseudo-error monitor circuit 3. From the filtered signal 1', the clock contact 15 branches off whose timing signal inputs to the decider circuit 3. A computing unit 5 is connected to the decider circuit and to filter 2. The computing unit 5 supplies signals, a level adjustment 6, phase adjustments PhM, Ph, Ph1, threshold value adjustments 8, an error reset 10 to the decider circuit, and an adjustment signal 11 to the digital filter 2. The decider circuit 3 supplies the error signals 9 to the computing unit 5.

The incoming signals 1 are first filtered in filter 2, and scanned in the decider circuit 3. For scanning, first the clock pulse 16 has to be extracted from the filtered signal 1'. In the decider circuit, that has a pseudo-error monitor circuit in the device disclosed, the input signal 1' is scanned and the output signal 4 emitted for further processing. The whole control of the receiver in the device disclosed is carried out in the computing unit 5, from which parameters 6, PhM, Ph1, 8 and 10 are adjusted for the decider/pseudo-error monitor circuit 3. The computing unit 5 also controls the coefficients of the filter 2 by means of the filter adjustments 11. Activation from the computing unit is effected by means of digital-to-analog converters, and the error signal 9 is evaluated by means of an analog-to-digital converter. Control through the computing unit is in a slow time-frame. In this case the control system does not work with the high incoming data rates. Conventional computing units can therefore be used for the control system. Using a control unit also offers the advantage that the initial values can easily be adapted both in the decider circuit 3 and also in the filter 2 by adapting the software.

Figure 2:
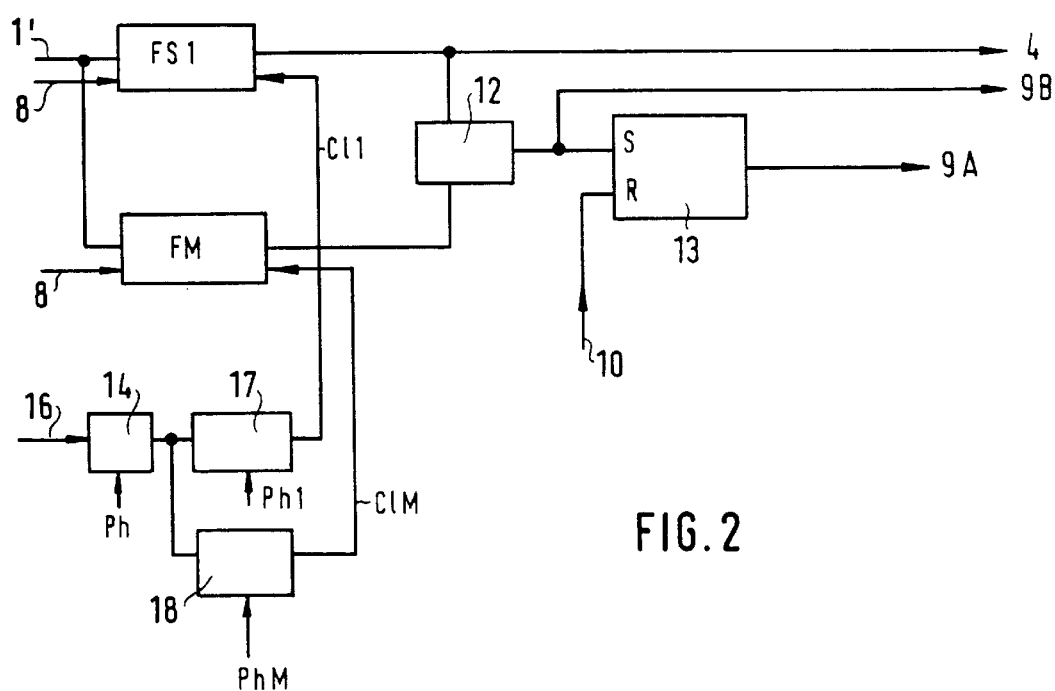
FIG. 2 shows a decider circuit with the optical receiver's pseudo-error monitor.

FIG. 2 shows an initial variant of the decider/pseudo-error monitor circuit 3 in the device disclosed. The filtered input signal 1' is linked to the input of a decider FS1 and a decider FM. The outputs of the two deciders are high at the input of an EXOR circuit. The output of the EXOR circuit 12 is linked to the input of an RS flip-flop 13 and to the data line 9B. The R input of the RS flip-flop 13 is connected to the reset output 10 of the computing unit. The output of the flip-flop 13 is connected to the line 9A to the computing unit. To adjust the decider FM, it is connected both to the threshold value adjustment 8 and also through a phase shifter 14 and a phase adjustment 17. The decider FS1 also has a connection to the threshold value adjustment 8, and a link to a variable phase adjustment 18 that branches off after the phase shifter 14. The variable phase adjustments 14, 17 and 18 are activated by phase adjustment signals Ph, Ph1, PhM.

The filtered input signal 1' similarly accesses the inputs of both the deciders FM and FS1. This involves two D flip-flops. Both the flip-flops FM and FS1 change to state 1 on the output side if the incoming signal 1' exceeds the threshold values 8 at the point in time of a clock pulse edge of the timing signals CI1 and CIM. The outputs of the flip-flops are linked to the EXOR circuit 12 that gives a signal when there are different signals present on the input side. The EXOR circuit 12 gives the error signal 9B thus leads to a DC signal at high error rates by means of the integrating characteristic of the analog-to-digital converter of the computer. A high DC level of signal 9B thus detects a high bit error rate. The output signal of the EXOR circuit 12 is high at the S input of the RS flip-flop 13. The RS flip-flop 13 changes to state 1 when a 1 is high at its S input. The flip-flop 13 can be reset via the R input. It is possible to detect individual bit errors via this RS flip-flop 13. The flip-flop stores the individual error until the computer analyses the output signal 9A of the flip-flop, and resets via the input R. This enables a computing unit to read out individual bit errors and analyze them, although the computing unit itself cannot follow the fast data rate of the optical transmission system. The values scanned in the decider circuits FM and FS1 are highly dependent on the threshold values 8, and also on the scanning phase. The decider FS1 is initially operated with a fixed phase adjustment. The timing signal 16 derived from the input signal is input to a phase shifter 14 that activates a phase adjustment 17. This phase adjustment is determined by the scanning phase CI1 of the decider FS1. Branching off after the phase shifter 14, a variable phase shifter 18 is used to determine the phase position of the second decider FM. The phase position CIM of the decider FM can be variably adjusted from 0–360°, in which case the adjustment is made by means of the phase adjustment signal PhM, Ph, Ph1 of the computing unit. To determine the bit error rate, the values for the decider FS1 are preset almost optimally, i.e. so that the scanning window and the scanning threshold is roughly in the center of the eye aperture of the signal received. By changing the scanning threshold in the decider FM, and the phase position CIM, the eye aperture is scanned both horizontally and vertically. The bit error rates thus determined serve to optimize the eye aperture and also to optimize the decider threshold and phase of FS1, and thus the reception characteristics of the optical receiver.

Figure 3:
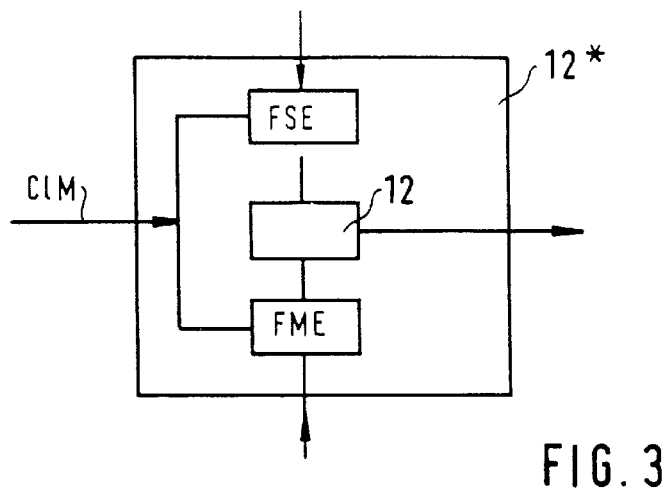
FIG. 3 shows an EXOR gate with pre-scanning.

FIG. 3 shows an alternative circuit of the EXOR gate 12, an expansion being made by means of two further deciders FSE and FME. The circuit described in FIG. 2 can lead to problems since the two scanning results to be compared of the two deciders FS1 and FM are not scanned at the same time. By inserting a second decider FSE and FME in the two signal branches that are activated respectively by the CIM phase of the decider FM, it is possible to exclude a source of error by after-scanning at the same point in time. The 12* circuit for example replaces the EXOR gate 12 in the variants in FIG. 2 and FIG. 4.

Figure 4:
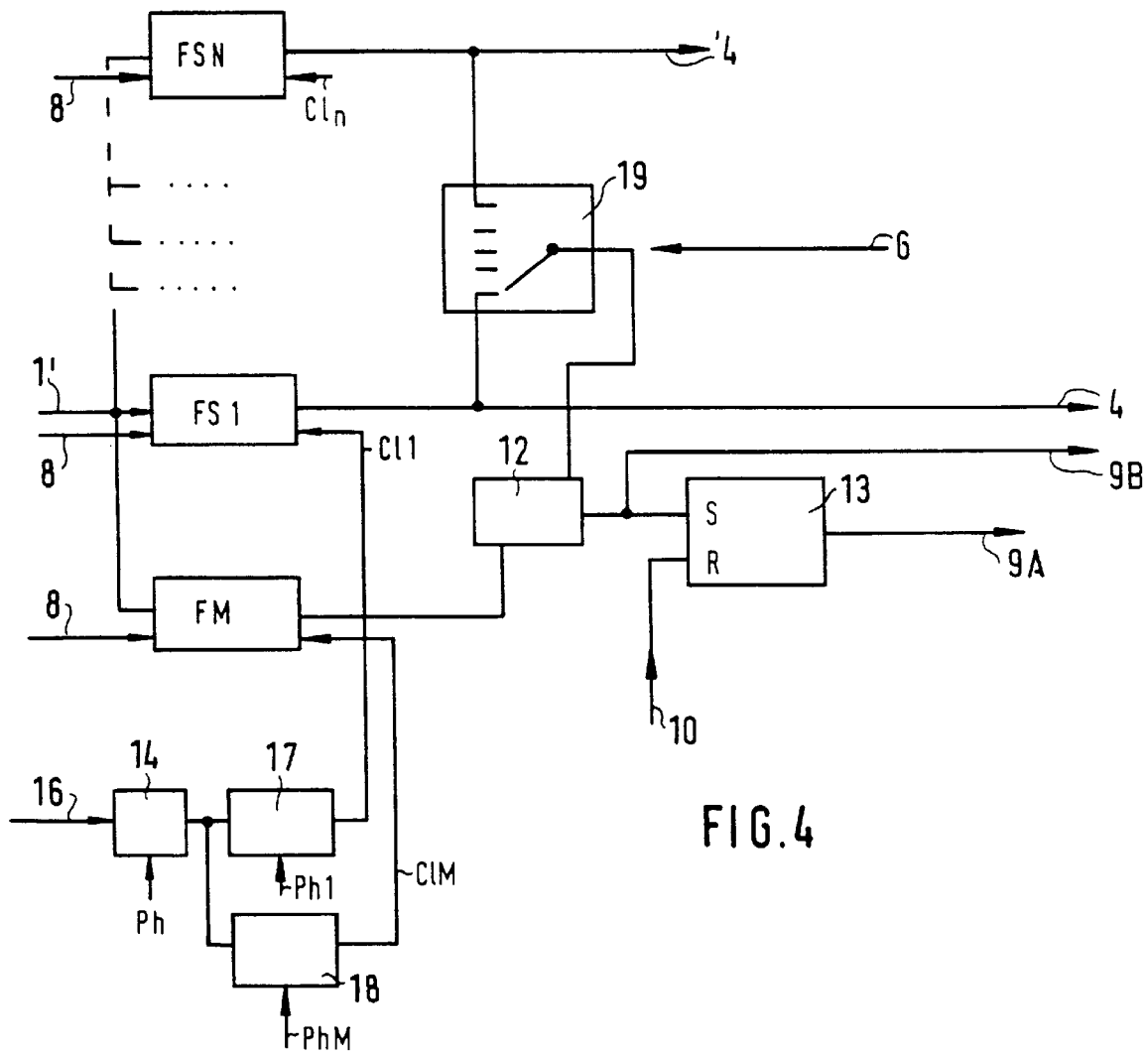
FIG. 4 shows a decision circuit for multi-level signals.

FIG. 4 shows the decider/pseudo-error monitor circuit with an expansion for multi-step signals. For example an optical signal for transmitting multi-step signals is disclosed in the patent application open to public inspection DE 43 41 408. In this case high data rates are achieved by adding several electrical digital signals, the bit sequences being transmitted optically as multi-step signals. In the optical receiver there is then a decider circuit that retrieves the digital signals. FIG. 4 shows such a decider/pseudo-error monitor circuit. The incoming data signal 1 is split to deciders FM to FSN connected in parallel. The deciders FM to FSN are each adjusted with optimal threshold values 8 and optimum scanning phases CIM to CIn. The bit error rate is determined via the decider FS1 only with a fixed-adjustment decider FM to FSN. Which decider is compared with the values of the, decider FS1 in the EXOR circuit 12 is set by means of a switch 19. The switch 19 connects the output of one of the deciders connected in parallel to an input of the EXOR circuit 12. The switch 19 is activated by means of the level adjustment 6 of the computing unit. If for example a four-level signal is received, three deciders FM to FSN are necessary. Each of the three deciders is optimally adjusted both in terms of its threshold value and of its phase position. The error. detection scans only one eye for the respective decider, as selected by the computer. The bit error rate for the eyes of the multi-level signal are not all determined at the same time. Even with the circuit shown in FIG. 4, the problem arises that avoidable errors occur by scanning at different phase positions. Therefore it is an advantageous expansion to use circuit 12* with the additional pre-scanning of the signal in this case as well.

Figure 5:
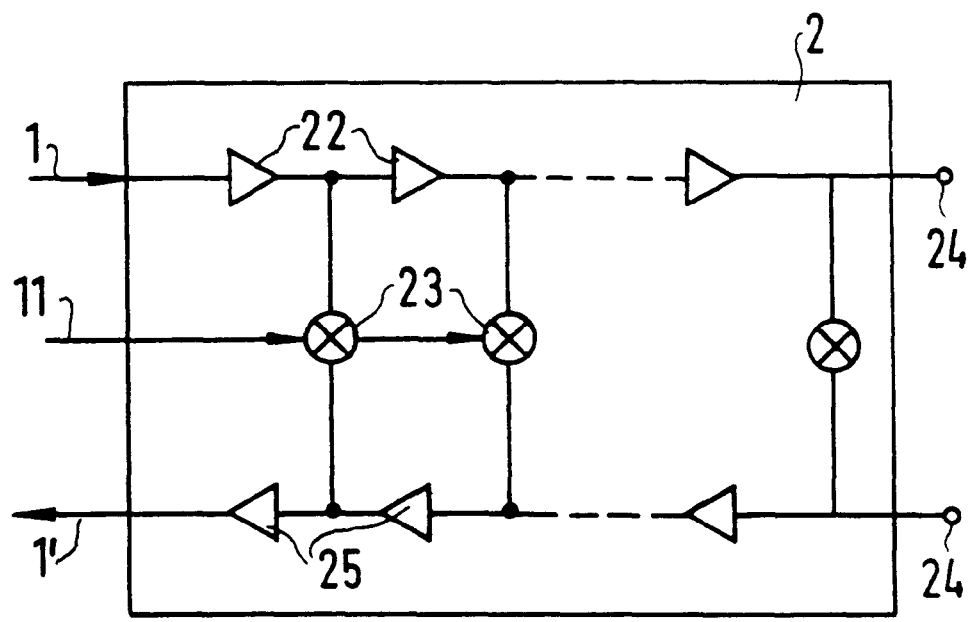
FIG. 5 shows a transversal filter.
Figure 6:
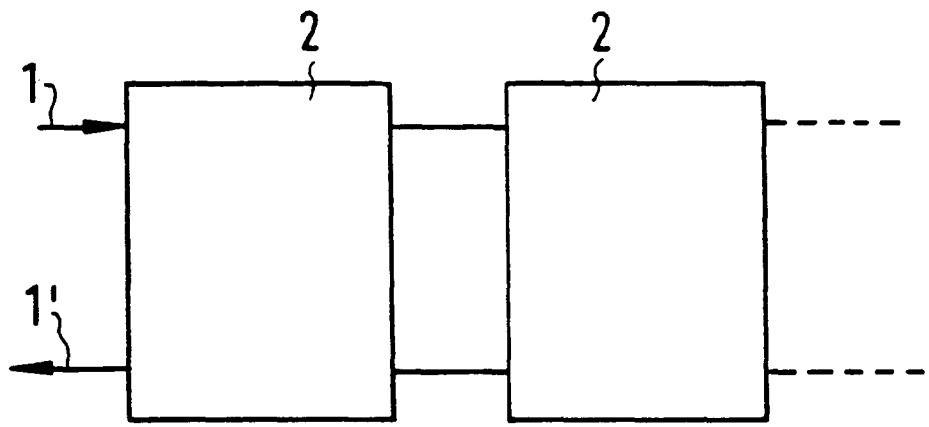
FIG. 6 shows a cascaded filter configuration.
Figure 7:
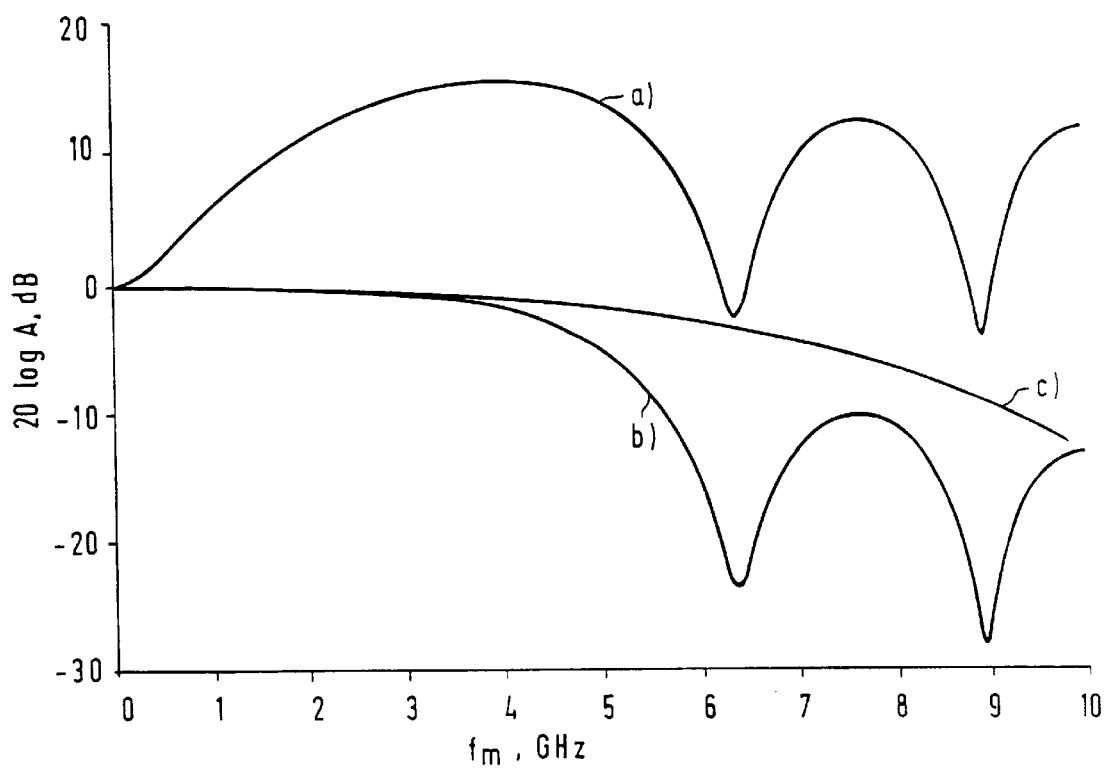
FIG. 7 shows an example of a DST signal transmission function.

A sample variant of filter 2 is shown in FIG. 5. The input: signal 1 is passed through a chain of input amplifiers 22. After each input amplifier 22 the signal is diverted to multipliers 23 that are each connected on the output side to the output amplifier chain 25. The multipliers 23 are activated by the filter adjustment signals 11. The multipliers 23 each have their own multiplication factors. Input signal 1 is subject to a delay time $\tau$ in each amplifier cell 22 and 25. The input signal is displaced in time by means of the amplifier cells, which have for example an amplification factor of 1, and by weighting the multipliers, reassembled to a filtered signal 1'. A symmetrical filter structure of this type has the advantage that no summation is required of all signals at one common point, which creates problems at high data rates. The proposed symmetrical filter structure also works reliably at high data rates. Such a transversal filter as per FIG. 5 corresponds for example to a low-pass filter depending on the adjustment of the coefficients. It is discernible from FIG. 6 that the transversal filter 2 can be simply concatenated with additional identical filters. The filter has connections through outputs 24 that can serve directly to link the next filter block. By cascading several filter blocks 2 it is possible to create filters of even higher order. A sample application of an optical receiver with a transversal filter as well as a pseudo-error monitor is shown in FIG. 7. This involves the transmission function a of a DST signal. Transmitting a DST signal is described in greater detail in EP 0 554 736. The transmission function of a DST signal shows a high-pass characteristic curve. For optimum detection of the signal, low-pass filtering of the signal a is desirable. Simple low-pass filtering, as also described in EP 0 554 736, produces a result that is represented by the graph b. A transversal digital filter as per FIG. 6, a higher order cascaded version of which is shown in FIG. 7, can significantly improve the result. The transmission function c shows an idealized picture of the use of a digital filter.

The use of the optical receiver disclosed for receiving DST signals thus has beneficial effects on bit error rates and sensitivity of the optical receiver. In this case both the filter characteristic curve of the digital filter and the decider adaptation both have an optimizing effect on the whole reception system by determining the bit error rate. The optical receiver disclosed also serves to detect signals that for example are received with interference because of polarization mode dispersion. Its use is thus not limited to DST signals or multi-level signals.

Figure 8:
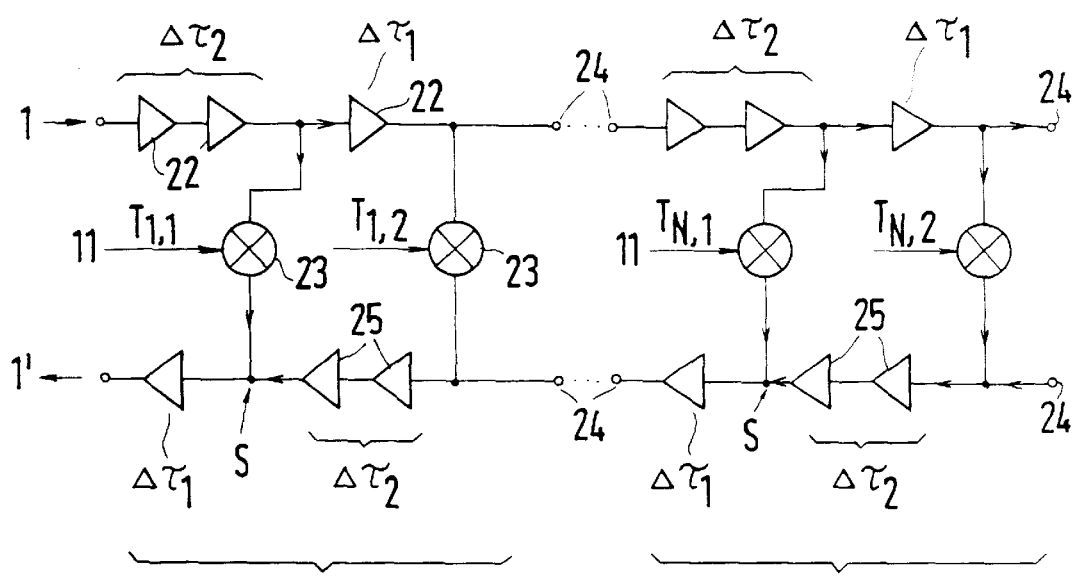
FIG. 8 discloses the structure of a filter.

A sample variant of the filter is shown in FIG. 8. The input signal 1 passes through a chain of input amplifiers 22. After each input amplifier 22, the signal is diverted to a multiplier 23 that are each connected to the output amplifier chain 25 on the output side. The multipliers 23 are activated by the filter adjustment signals 11. The multipliers 23 each have their own weighting factors. The input signal 1 is subject to a delay time $\_\tau1$ or $\_\tau2$ at each amplification cell 22 and 25. The input signal is displaced in time through the amplifier cells that for example have an amplification factor of 1, and reassembled to form a filtered signal through the weighting of the multipliers. Such a symmetrical filter structure has the advantage that the signals do not all have to be summated at a common point, which is problematic at high data rates. The proposed symmetrical filter structure also works reliably at high data rates. A transversal filter of the type shown in FIG. 8 corresponds for example to a low-pass filter depending on the adjustment of the coefficients. It can be seen from FIG. 8 that the transversal filter can easily be concatenated with additional identical filters.

Through the outputs 24, the filter has connections that can serve directly to link the next filter block. By cascading several filter blocks, it is possible to realize filters of even higher order.

What is claimed is:

1. An optical receiver for receiving digitally transmitted data (1) that is distorted especially because of linear and/or non-linear effects of the data transmission line, the receiver containing a filter (2) and a decision circuit (3) for detecting the incoming data signals (1), and a clock contact (15), the decision circuit (3) being connected to a computing unit (5), whereby the decider circuit (3) contains a pseudo-error monitor circuit for threshold-value-dependent and phase-dependent detection of bit errors, and parameters of the filter (2) and of the decider/pseudo-error monitor circuit (3) can be adjusted by the computing unit (5) connected to them.

2. An optical receiver according to claim 1 whereby in the decision/pseudo-error monitor circuit (3) at least 2 threshold-value deciders (FM, FS1) are connected to an EXOR circuit (12) that in the case of different input values gives an integrable first error signal (9B) and a second error signal (9A) via intermediate storage in an RS flip-flop (13) linked to the EXOR circuit (12).

3. An optical receiver according to one of the preceding claims whereby the RS flip-flop (13) stores a bit error temporarily and the computing unit (5) returns the RS flip-flop (13) to its original state with an individual error reset (10) after the second bit error signal (9A) has been read out.

4. An optical receiver according to claims 1 or 2, whereby the computing unit (5) adjusts phase positions of the clock input signals (CIM, CI1) of the decision circuits (FM, FS1) via a phase shifter (14) and phase adjusting members (17, 18) that are connected to the decision circuits with the aid of a clock signal (16) and phase adjustment (PhM, Ph, Ph1), and determines the threshold value settings (8) for the decision circuit (FM, FS . . . ).

5. An optical receiver according to claims 1 or 2, whereby an EXOR gate with pre-scanning (12*) is used, there being an additional decider (FSE, FME) before the respective EXOR gate (12) triggered by the clock pulse (CIM) of the signal of the phase adjusting member (18).

6. An optical receiver as per one of the preceding claims whereby several deciders (FS1 . . . FSN) are connected together in parallel with a switch (19) that is connected to the EXOR circuit (12), and a signal level adjustment (6) of the computing unit (5) causes the switch (19) to change state.

7. An optical receiver according to claims 1 or 2, whereby several deciders (FS1 . . . FSN) are connected together in parallel with a switch (19) that is connected to the EXOR circuit with pre-scanning (12*), and a signal level adjustment (6) of the computing unit (5) causes the switch (19) to change state.

8. Optical receiver as per one of the preceding claims whereby the filter is constructed of amplifiers (22) with fixed or variable delay time, the input amplifier (22) being connected to the output amplifiers (25) by adjustable digital multiplier units (23).

9. Optical receiver according to claims 1 or 2, whereby the digital multiplier units (23) can be adjusted by signals for filter adjustment (11) from the computing unit (5).

10. An optical receiver according to claims 1 or 2, whereby at least one additional filter (2) can be connected via the outputs (24).

11. Use of an optical receiver according to claim 1, whereby data (1) is received in a DST (Dispersion Supported Transmission) mode of simple and/or higher order.

12. Use of an optical receiver according to claim 1, whereby multi-level signals or DST signals are received.

13. An optical receiver for receiving digitally transmitted data according to claim 1, with a filter (1) on the input side whereby the filter (1) is constructed of amplifiers (22, 25) and digital multiplier units (23), the input amplifiers (22) being connected respectively via digital multiplier units (23) to the output amplifiers (25) and additional input amplifiers, and the output amplifiers (25) being connected to additional output amplifiers.

14. An optical receiver according to claim 1, whereby the amplifiers (22, 25) have an amplification value of 1.

15. An optical receiver according to claim 1, whereby the digital multiplier units (23) multiply the signals of the input amplifiers (22) connected to them with a weighting factor between −1 and +1.

16. An optical receiver according to claim 1, whereby the weighting factors are adjustable on the basis of evaluating the signal in the receiver.

17. An optical receiver according to claim 1, whereby the number of amplifiers (22, 25) is variable.

18. An optical receiver according to claim 1, whereby the number of amplifiers (22,25) is different in the forward and the backward direction.

19. An optical receiver according to claim 1, whereby at least one additional filter can be connected to the outputs. (24).

20. An optical receiver according to claim 1, whereby the amplifiers (22, 25) alternate in having different delay times $\tau 1$ and $\tau 2$.

* * * * *